Sept. 19, 1961   J. L. BOWER   3,001,081
PHOTOELECTRIC GAGE
Filed Aug. 19, 1957   3 Sheets-Sheet 1

INVENTOR.
JOHN L. BOWER
BY
ATTORNEY

Sept. 19, 1961  J. L. BOWER  3,001,081
PHOTOELECTRIC GAGE
Filed Aug. 19, 1957  3 Sheets-Sheet 2

INVENTOR.
JOHN L. BOWER
BY
ATTORNEY

Sept. 19, 1961 J. L. BOWER 3,001,081
PHOTOELECTRIC GAGE
Filed Aug. 19, 1957 3 Sheets-Sheet 3

INVENTOR.
JOHN L. BOWER
BY Frederic B. Schramm
ATTORNEY

United States Patent Office 3,001,081
Patented Sept. 19, 1961

3,001,081
PHOTOELECTRIC GAGE
John L. Bower, Downey, Calif., assignor to
North American Aviation, Inc.
Filed Aug. 19, 1957, Ser. No. 678,886
11 Claims. (Cl. 250—222)

This invention relates to photoelectric gages and concerns particularly gages of the relatively moving optical grid type.

An object of the invention is to provide a simplified phototube system for a photoelectric gage and to simplify means for producing oppositely phased impulses.

In order to produce highly precise indications of measurements and positioning of machine tools and for precise measurement of long distances as well as short distances, a digital register system is desirable. For producing digital indications, relatively movable grids may be provided as described in my copending application, Serial No. 520,086, filed July 5, 1955. In such a system there are numerous opaque lines ruled on translucent or transparent rods to form grids. In successive relative positions of the grids they permit light to be transmitted from a light source to photoelectric responsive means or cut off such light so as to produce electric impulses corresponding in number to the distance moved by one grid relative to the other. In order to increase precision, obtain indications of directionality and either register the net movement or totalize the excursions in one direction separately from the excursions in the opposite directions, a plurality of photoelectric tubes may be arranged in bridge connection so as to produce pairs of oppositely-phased impulses which in turn are so arranged as to introduce a quadrature or smaller angular relationship between the sets of oppositely-phased impulses. The phototube system and associated optical apparatus and some of the electrical elements are of necessity mounted in a gage head.

In order to increase the compactness and lightness of the gage head, it is desirable to simplify the optical system and reduce the number of photoelectric response devices required to achieve precision or to accomplish directional signals.

It is accordingly an object of the invention to effect each phase-opposition by use of a single photosensitive device instead of a pair of such devices.

One of the problems in detection of light variations in each phase of the gage head is the subtraction of two signals representing two transmitted light intensities while providing a sum signal that is adequate to hold constant the gain of the channel, in order to achieve satisfactory functioning of the electrical circuits for converting the light impulses to counter registration.

It is accordingly an object of the invention to satisfy the foregoing requirements as well as to achieve a minimum of drift of the electrical circuits.

Other and further objects, features and advantages of the invention will become apparent as the description proceeds.

In carrying out the invention in accordance with a preferred form thereof, glow lamps with electrodes which become illuminated or glow only during alternate half cycles of an alternating-current supply source are utilized to provide oppositely-phased signals. Thus the subtraction of two signals is accomplished by the inherent characteristics of the glow lamps to permit a single photo responsive device to indicate subtraction of two signals. Separate optical paths to the photo responsive device are provided for the light emitted from alternately glowing lamp electrodes. Different portions of a relatively movable rod grid and head grid are interposed in the two optical paths.

The electric output from the photoelectric responsive devices is filtered to produce a fundamental frequency signal for actuation of the counter circuits. It is also filtered by a filter cutting off the fundamental for supplying a second-harmonic signal responsive to variations of average light transmission to produce a control signal for regulating the voltage output of the supply source or the gain of an amplifier interposed in the output circuit of the photoelectric response device.

A better understanding of the invention will be afforded by the following detailed description considered in conjunction with the accompanying drawing in which FIG. 1 is a perspective view of the general type of photoelectric gage in which the invention of this application may be employed;

Like reference characters are utilized through the drawing to designate like parts.

Figure 1:
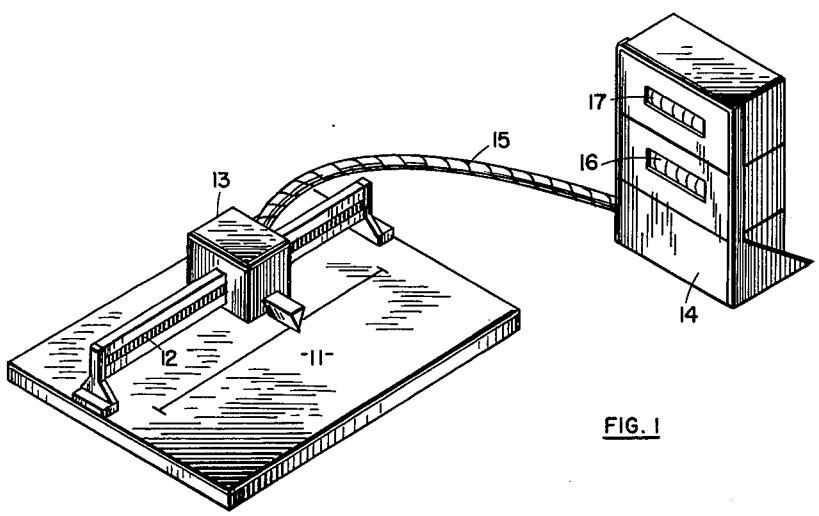

Referring to FIG. 1, there is shown a photoelectric gage having a base 11 upon which is mounted a rod 12 with a gage head 13 movable along the rod 12 in accordance with a linear measurement to be made or positioning of a machine tool. There is a register 14 connected to the gage head 13 having an electric cable 15 and having a pair of dials 16 and 17 for recording the summation of movements of the gage head 13 in each direction or if desired a single dial may be employed to indicate the net movement or the actual position of the gage head 13 in relation to the rod 12.

Figure 2:
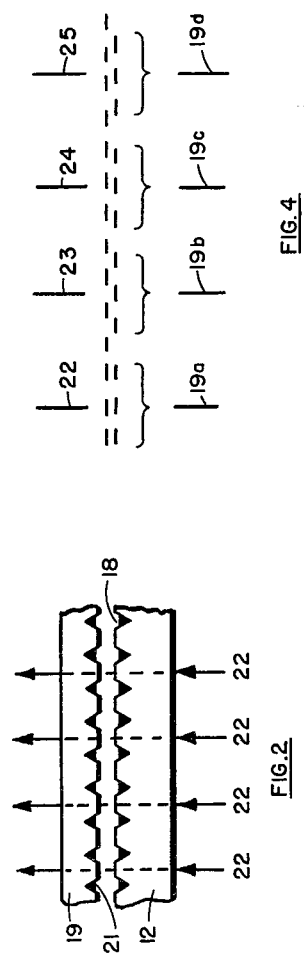
FIG. 2 is a fragmentary diagram illustrating the arrangement of relatively movable optical grids for producing light impulses as relative movement of the grids takes place.

As described in greater detail in my copending application, the rod 12 may be composed of translucent or transparent material such as quartz having a plurality of transverse grooves 18 filled with opaque material or having a plurality of closely spaced lines ruled thereon. It is to be understood that in FIG. 2 the dimensions are greatly exaggerated and that the division lines are actually very closely spaced of the order of $2/1000$ of an inch or less apart. The gage head 13 also includes a grid 19 which corresponds to the gage rod 12 having grooves 21 corresponding to the grooves 18 of rod 12.

Figure 4:
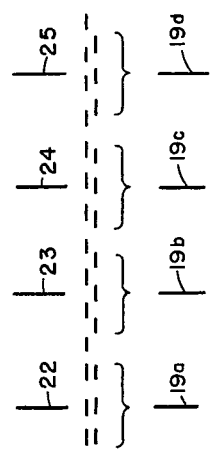
FIG. 4 is a schematic diagram illustrating the arrangement of different portions of the optical grid, one portion of which is shown in FIG. 2, in order that appropriate phase relations will be obtained for different signals.

As shown in FIG. 4, preferably the head grid 19 is divided into 4 separate portions 19a, 19b, 19c and 19d so positioned in relation to the divisions of the grid 12 that when the head grid 19a presents minimum obstruction to the passage of light beams 22, the head grid 19b presents maximum obstruction to the passage of light beams 23. Likewise, the head grids 19c and 19d are so located in relation to each other that one presents maximum obstruction to the passage of light beams 24 when the other presents minimum objection to the passage of light beams 25. However, the head grids 19c and 19d are so positioned in relation to the head grids 19a and 19b that they are in an intermediate position when the head grids 19a and 19b are in the relatively opposite positions. Employing the terminology of space-phase relationship, it may be said that the heads grids 19a and 19b are positioned in opposed-space phase; likewise the head grids 19c and 19d are positioned in opposed-space phase with the head grids 19c and 19d in quadrature space phase relationship to head grids 19a and 19b.

Figure 3:
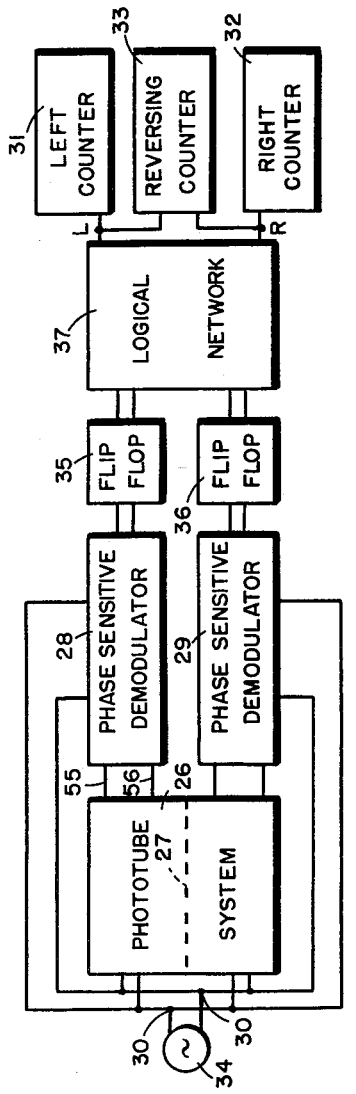
FIG. 3 is a block diagram illustrating the electrical circuit relationship of the elements of a photoelectric counter system for a gage or machine tool positioner in accordance with the invention.

As illustrated in FIG. 3, in order to convert the light impulses resulting from relative movement of the girds 12 and 19 into suitable electrical signals for directional indication and registration of movement on counters, a system of electrically connected elements is employed. There is a phototube system 26, preferably dual for the sake of increased precision and directionality as indicated by the division line 27 to represent duplicate elements. Provided also are a phase sensitive demodulator 28 for one half of the phototube system, a second phase sensitive demodulator 29 for the second half of the phototube system if a second half is employed, and counters 31 and 32 for indicating left and right and excursions respectively. A single reversing counter 33 may be employed for indicating position at any instant. A common energizing and phase-reference source of alternating current 34 is provided having output terminals 30.

Flip flops or equivalent bistable devices 35 and 36 are provided for converting the phase-responsive output signals of the demodulators 28 and 29 into appropriate steady state voltages, and a logical network 37 is employed for interpreting the state and the change in state of the flip flops 35 and 36 to produce the requisite actuations of either the left counter 31 or the right counter 33, and the reversing counter 33 to register the desired measurement.

Figure 5:
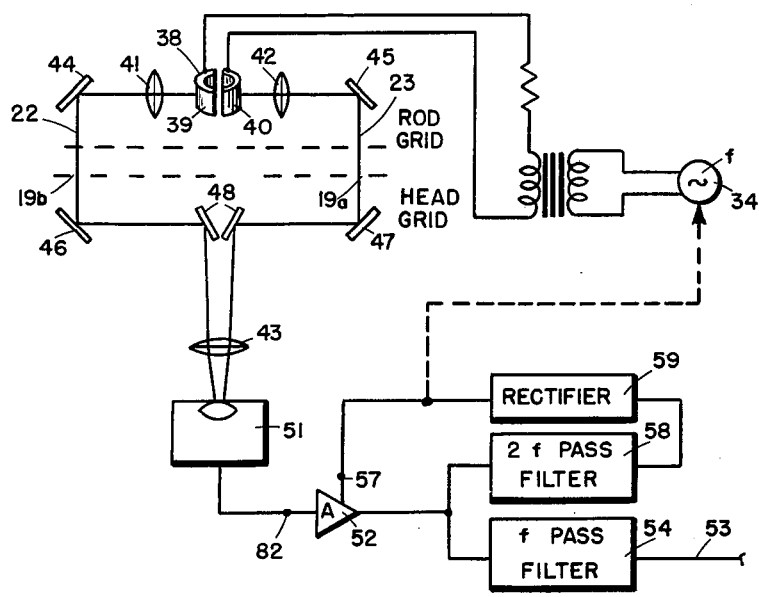
FIG. 5 is a schematic diagram of one half the phototube system employed in the arrangement of FIG. 3.

FIG. 5 represents a phototube system which may constitute one half of the system 26 illustrated in FIG. 3. A lamp 38 is provided, which is of such a type as to become illuminated only on alternate half cycles of an alternating-current source 34 or to become illuminated in different areas during alternate half cycles. For example, the lamp 38 may be of the gaseous discharge type having a pair of symmetrically mounted electrodes 39 and 40 such as in certain types of neon tubes with a glow discharge appearing upon the surfaces of the electrodes 39 and 40 alternately in alternate half cycles. When this type of neon tube 38 is employed, optical directing means such as condensing or focusing lenses 41, 42, 43 and mirrors 44, 45, 46 and 47 and 48 are provided to direct the light from the lamp 38 in two separate optical paths 22 and 23 upon a photo responsive device 51 such as a photo transistor, for example.

The optical paths 22 and 23 are so arranged that different portions of the rod grid 12 and the head grid 19 are interposed in the light paths 22 and 23.

As represented schematically in FIG. 5, an amplifier 52 is provided for converting output electrical impulses of the photo responsive devices 51 into electrical signals of sufficient amplitude in a counter actuating input channel schematically represented by a line 53 corresponding to conductors 55 and 56, for example, of FIG. 3. A suitable filter 54 is interposed in the channel 53 having a cut-off point for transmitting only the fundamental frequency of the alternating-current source or generator 34.

The amplifier 52 is provided with a gain control terminal 57 which is inversely responsive to magnitude of unidirectional voltage to enable the gain to be adjusted automatically for constant output level in the channel 53.

To this end a filter 58 and a rectifier 59 are interposed between the output of the amplifier 52 and the voltage responsive gain control terminal 57. The filter 58 has a cut-off frequency below the second harmonic of the alternating current source 34 and is preferably a second harmonic band pass filter. However, the invention is not limited to the specific output level maintenance arrangement described and does not exclude the use of an oscillator or generator 34 having a voltage-responsive output voltage regulating terminal connected to the output of the rectifier 59.

Figure 6:
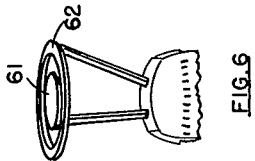
FIG. 6 is a perspective view of a different form of lamp which may be employed in lieu of the symmetrical electrode type illustrated in FIG. 5.
Figure 7:
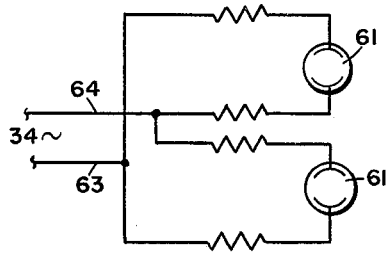
FIG. 7 is a circuit diagram illustrating the connections of light sources of the type of FIG. 6 employed to produce the optical effect of the arrangement of FIG. 5.

If desired, in order to simplify the optical arrangements, two separate lamps instead of the symmetrical electrode lamp 38 may be employed, such as neon lamps of the General Electric NE-17 type, for example, as illustrated in FIG. 6 having a center electrode 61 and a concentric ring electrode 62 with a luminous glow appearing on the center electrode 61 for every other cycle of the exciting alternating current. In order that the center electrodes 61 of complementary tubes will glow alternately, such tubes are connected as illustrated in FIG. 7 with the center electrode 61 of one neon tube connected to the conductor 63 of the alternating current source 34 and the other center electrode 61 connected to the other conductor 64 of the alternating current source 34.

When this type of lamp is employed, focusing lenses 65 and 66 are provided for focusing an image of only the center electrode 61 of each lamp upon the sensitive portion of the photo responsive device 51.

Figure 9:
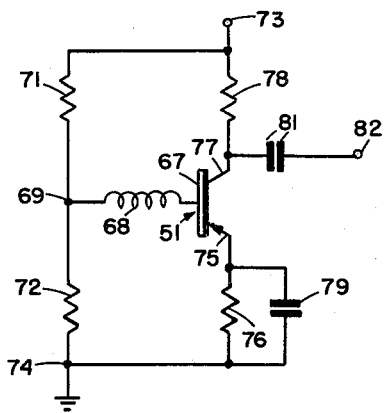
FIG. 9 is a circuit diagram illustrating in detail the circuit arrangement of a preferred form of photoelectric responsive device such as a photo transistor employed for the sake of compactness and minimum power requirements.

The photo responsive device 51 may take the form, for example, of a Radio Receptor Type RR66 type photo transistor. In the connection as illustrated in FIG. 9 the photo transistor 51 has a base 67 connected through a high frequency choke 68 to an intermediate point 69 of a voltage divider consisting of resistors 71 and 72 connected between a point of suitable negative voltage such as a —11 volt direct-current terminal 73 and a zero volt or ground terminal 74. The photo transistor 51 likewise has an emitter 75 connected through a resistor 76 to the zero potential terminal 74 and a collector 77 connected through a resistor 78 to the negative bias terminal 73. Preferably a relatively large capacity by-pass condenser 79 is connected across the resistor 76 and a relatively small capacity coupling condenser 81 is connected between the collector 77 and an output terminal 82, serving as an input terminal for the amplifier 52 or FIG. 5.

Since the two electrodes 39 and 40 of FIG. 5 glow separately at opposite half cycles, when the light from the two of them is combined in the sensitive area of the photo responsive device 51, the resulting current in the two half cycles will produce fundamental components that oppose each other in phase. In effect therefore the fundamental frequency components subtract in order to perform the subtraction required in the type of gage head illustrated in FIG. 1 for the system represented schematically in FIGS. 2, 3 and 4. At the same time the second harmonic currents produced in the separate half cycles are additive in the double frequency pass filter 58. The rectifier 59 produces a current proportional to the average transmission through the two optical channels 22 and 23 of the system for one phase of the gage head in order to supply the requisite control voltage to the terminal 57 for maintaining uniform gain of the channel 53.

In the arrangement illustrated in FIG. 5, the light beams 22 and 23 from the two electrodes 39 and 40 of the neon lamp 38 are separately picked up and reflected in mirrors 44 and 45, transmitted through the grid or gage rod 12 through the windows or portions 19a and 19b of the head grid 19 to mirrors 46, 47 and 48 and through a condensing lens 43 to the photo sensitive surface of the device 51. It is to be understood that the mirrors 48 are tilted to give the best superposition of the images on the photo sensitive surface. The amplitude and direction of the signal from the photo sensitive device 51 appearing on the terminal 82 indicate the degree and direction of predominance of transmission through the grid portions 19a and 19b.

Figure 8:
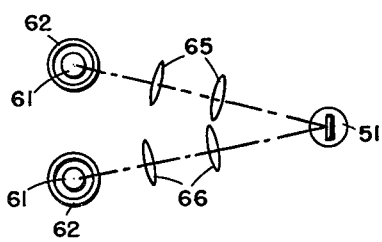
FIG. 8 is a schematic diagram of the optical system employing lamps of the type illustrated in FIG. 6.

The same type of action takes place when employing the lamp arrangement of FIGS. 6, 7 and 8 with the beam from one lamp passing through lens 65 and the grating portions 19a and the beam from the other lamp passing through the lenses 66 and the grating portion 19d.

Figure 10:
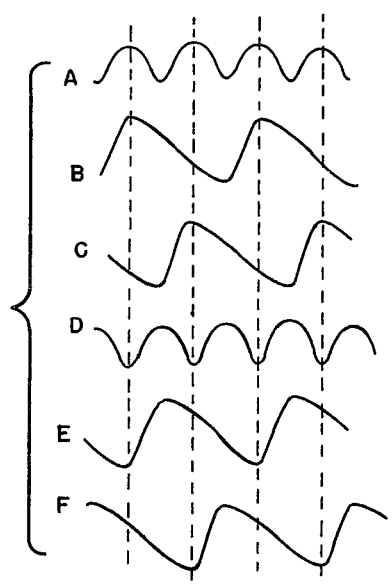
FIG. 10 is a graph illustrating the phase relationship between different signals obtained in the arrangement illustrated in FIGS. 5 and 3.

The operation is explained analytically by the curves of FIG. 10 in which curve A represents the output of the second harmonic pass filter 58 similar to the output from a full wave unfiltered rectifier.

When the beam in the light path 23 is interrupted, the output voltage appears as represented in curve B of FIG. 10, and is similar to the output of a half wave slightly filtered rectifier. On the other hand, when the beam in the other light path 22 is interrupted, the output appears as shown in curve C of FIG. 10. It is similar to the output of a half wave slightly filtered rectifier excited by a voltage 180° out of phase with the excitation for the electrode 39 of the lamp 38.

Similar curves D, E and F of FIG. 10 represent the output of the other half of the phototube system 26 of FIG. 3, similar to that illustrated in FIG. 5, except with the light paths 24 and 25 so interrupted by the quadrature displacement of the head grid portions 19 or 19d that the curves E and F are in quadrature relationship to the curves B and C, respectively, of FIG. 10, curves A and D in effect being in phase opposition.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a photo electric gage, a phototube system comprising a pair of terminals for connection to a source of alternating current, gaseous discharge glow lamp means having opposite electrodes operatively connected to said terminals to become luminous on alternate cycles of alternating current supplied to such terminals, a gage head grid and a rod grid, relatively movable, a photoelectric responsive device, optical light occulting means mounted to form two independent paths between said photoelectric responsive device and said lamp means with one electrode included in one path and an opposite electrode included in the other path, different portions of said grids being interposed in said optical paths for occulting light in one or the other of the optical paths according to the relative position of the grids, a counter system input line including a phase-sensitive demodulator operatively connected to said photoelectric response device for receiving fundamental frequency pulses in response to relative movement of said grids, a fundamental frequency filter interposed in said counter system input line, a voltage-responsive control terminal for controlling output to said counter system input line, and a filter having a pass band at twice fundamental frequency, interconnecting said control terminal and said counter system input line for compensating variations in light transmission to maintain substantially constant output to said counter system input line.

2. In a photoelectric gage, a phototube system comprising in combination a pair of terminals for connection to a source of alternating current, a glow lamp having a pair of symmetrical electrodes operatively connected to said terminals to become luminous on alternate half cycles of alternating current supplied to said terminals, a gage head grid and a rod grid relatively movable, a photoelectric responsive device, an optical light directing means mounted to form two optical paths between said photoelectric responsive device and respective electrodes of said glow lamp, different portions of said grids being interposed in said optical paths for occulting light in one or the other of the optical paths according to the relative positions of the grids, a counter system input line including a phase-sensitive demodulator operatively connected to said photoelectric device for receiving pulses of fundamental frequency corresponding to the source of alternating current connected to said terminals in response to relative movement of said grids, a fundamental frequency filter interposed in said counter system input line, a voltage-responsive control terminal for controlling output to said counter system input line, and a filter having a pass band at twice fundamental frequency interconnecting said control terminal and said counter system input line for compensating variations in light transmission to maintain substantially constant output to siad counter system input line.

3. A phototube system as in claim 1 wherein an adjustable voltage source of alternating current is connected to said terminals, said voltage source having a voltage control terminal constituting the voltage responsive control terminal.

4. A phototube system as in claim 1 wherein an amplifier is interposed between the photoelectric response device and said filters, said amplifier having a gain control terminal constituting the voltage-responsive control terminal.

5. A photoelectric gage comprising means for alternately producing one and then the other of two light beams, grid means having relatively moving elements positioned to receive light from said light beams for modulating the light from said beams in opposite phase relationship to each other, said grid means having a first portion positioned to receive light from one of said beams and a second oppositely phase related portion positioned to receive light from the other of said beams, means for producing a signal representing the difference between the light passed from said first and second oppositely phased grid portions, said difference producing means comprising a single photosensitive responser positioned to receive the light passed from both said first and second grid portions, said responser having an electrical output proportional to the difference between the light received thereby from said first and second beams.

6. In a photoelectric gage, a phototube system comprising a pair of terminals for connection to an alternating-current source, a pair of gaseous discharge glow lamp means of the concentric electrode type with a center electrode and a circular surrounding electrode, said electrodes being operatively connected to said terminals, the center electrode of one lamp connected to one terminal and the center electrode of the other lamp connected to the other terminal, a gage head grid and a rod grid relatively movable, a photoelectric response device, optical means for focusing an image of the center electrode of each lamp upon the photoelectric responsive device including light directing means forming separate optical paths between said photoelectric response device and said center electrodes, different portions of said grids being interposed in said optical paths for occulting light in one or the other of the optical paths according to the relative positions of the grids, a counter system input line operatively connected to said photoelectric response device for receiving fundamental frequency pulses in response to relative movement of said grids, a fundamental frequency filter and a phase-sensitive demodulator interposed in said counter system input line, a voltage-responsive control terminal for controlling output to said counter system input line, and a filter having a pass band at twice fundamental frequency interconnecting said control terminal and said counter system input line for compensating variations in light transmission to maintain sub- 7. In a photoelectric gage, a phototube system comprising a pair of terminals for connection to a source of alternating current, glow lamp means having different electrodes operatively connected to said terminals to become luminous on alternate cycles of alternating current supplied to such terminals, a photoelectric responsive device having a single photosensitive responser, a gage head grid and a rod grid, relatively movable, forming optical light occulting means mounted to form two independent paths between said photosensitive responser and lamp means with one electrode included in one path and another electrode included in the other path, different portions of said grids being interposed in said optical paths for occulating light in one or the other of the optical paths according to the relative position of the grids, and a counter system input line including a phase-sensitive demodulator operatively connected to said photoelectric response device for receiving the output of said photosensitive responser in response to relative movement of said grids.

8. In a photoelectric gage, a phototube system comprising, in combination a pair of terminals for connection to a source of alternating current, glow lamp means having electrodes operatively connected to said terminals to become luminous on alternate half cycles of alternating current supplied to said terminals, a gage head grid and a rod grid relatively movable, a photoelectric responsive device, an optical light directing means mounted to form two optical paths between said photoelectric responsive devices and respective alternately luminous electrodes of said glow lamp means, different portions of said grids being interposed in said optical paths for occulting light in one or the other of the optical paths according to the relative positions of the grids, a counter system input line including a phase-sensitive demodulator operatively connected to said photoelectric device for receiving pulses in response to relative movement of said grids, a voltage-responsive control terminal for controlling output to said counter system input line, and a filter having a pass band at twice fundamental frequency interconnecting said control terminal and said counter system input line for compensating variations in light transmission to maintain substantially constant output to said counter system input line.

9. In a photoelectric gage, a phototube system comprising a pair of terminals for connection to an alternating-current source, lamp means having alternately luminous elements, said lamp means being operatively connected to said terminals, a gage head grid and a rod grid, relatively movable, a photoelectric response device having one photosensitive responser light directing means forming two separate optical paths between said photosensitive responser and said lamp elements, one of said lamp elements being included in one of said paths, the other of said lamp elements being included in the other of said paths, different portions of said grids being interposed in said optical paths for occulting light in one or the other of the optical paths according to the relative positions of the grids, and a counter system input line including phase-sensitive demodulator means operatively connected to said photoelectric responsive device for receiving the output of said photosensitive responser in response to relative movement of said grids.

10. In combination, a photoelectric system comprising a pair of terminals for connection to a source of alternating current, lamp means operatively connected to said terminals having elements which become luminous on alternate cycles of alternating current supplied to said lamp means, a photoelectric responsive device having a single photosensitive responser, optical light occulting means having relatively movable members including portions displaced in space phase mounted to form two independent paths between said photosensitive responser and said lamp means with one lamp element included in one path and another lamp element included in the other path, different portions of said occulting means being interposed in said optical paths for occulting light in one or the other of the optical paths according to the relative position of the grids, and producing oppositely phased impulses, and a counter system input line including a phase sensitive demodulator for converting the impulses into signals of opposite polarity operatively connected to said photoelectric response device for receiving the output of said photosensitive responser in response to relative movement of said light occulting means.

11. In a photoelectric gage, a photoelectric system comprising a pair of terminals for connection to an alternating-current source, lamp means having alternately luminous elements, said lamp means being operatively connected to said terminals, a gage head grid and a rod grid, relatively movable, a photoelectric response device having at least one photosensitive responser, light directing means forming separate optical paths between said photosensitive responser and said lamp elements, different portions of said grids being interposed in said optical paths and being displaced in space phase for occulting light in one or the other optical paths according to the relative positions of the grids, and producing oppositely-phased impulses in response to relative grid movement, and a counter system input line, including phase-sensitive demodulator means, for converting the impulses into signals of opposite polarity, operatively connected to said photoelectric response device for receiving signals in response to relative movement of said grids.

References Cited in the file of this patent

UNITED STATES PATENTS

| 2,065,421 | Bernarde | Dec. 22, 1936 |
| 2,176,442 | Wise | Oct. 17, 1939 |
| 2,451,972 | Powers | Oct. 19, 1948 |
| 2,557,219 | Flint et al. | June 19, 1951 |
| 2,562,181 | Frommer | July 31, 1951 |
| 2,586,540 | Holden | Feb. 19, 1952 |
| 2,656,106 | Stabler | Oct. 20, 1953 |
| 2,857,802 | Cail | Oct. 28, 1958 |
| 2,861,345 | Spencer | Nov. 25, 1958 |
| 2,880,512 | Fenemore et al. | Apr. 7, 1959 |
| 2,886,717 | Williamson et al. | May 12, 1959 |
| 2,886,718 | Shepherd et al. | May 12, 1959 |
| 2,916,826 | Bower et al. | Dec. 15, 1959 |